United States Patent Office 3,518,264
Patented June 30, 1970

3,518,264
PROCESS FOR THE PREPARATION OF
TRIACRYLYL PERHYDRO-s-TRIAZINES
Warren L. Beears, Brecksville, Ohio, assignor to The B. F.
Goodrich Company, New York, N.Y., a corporation of
New York
No Drawing. Filed Oct. 25, 1968, Ser. No. 770,819
Int. Cl. C07d 55/12
U.S. Cl. 260—248
5 Claims

ABSTRACT OF THE DISCLOSURE

In the reaction of $\alpha,\beta$-olefinically unsaturated nitriles with formaldehyde to form perhydro-s-triazines, the formation of polymeric by-product has been minimized while yields of perhydro-s-triazine greater than 95% are obtained. To obtain these improved results the reaction is conducted in a chlorinated hydrocarbon solvent with an excess of the $\alpha,\beta$-olefinically unsaturated nitrile and a low concentration of an acid catalyst.

BACKGROUND OF THE INVENTION

The preparation of perhydro-s-triazines via the acid-catalyzed reaction of nitriles with formaldehyde is described in U.S. Pat. 2,568,620. The preparation of perhydro-s-triazines in chlorinated solvents has also been reported by W. D. Emmons et al. in J. Amer. Chem. Soc., 74, 5524–5525 (1952). The reaction is complicated, however, when $\alpha,\beta$-olefinically unsaturated nitriles are employed. With $\alpha,\beta$-olefinically unsaturated nitriles, polymeric products, believed to be predominantly polynitriles and polyamides, are formed. Often as high as 13% or more of the product obtained is polymeric impurity. These polymeric impurities must be removed to obtain perhydro-s-triazines of suitable purity for most applications. It is advantageous in conducting the reaction of $\alpha,\beta$-olefinically unsaturated nitriles with formaldehyde to avoid the formation of polymeric by-products and thereby obtain perhydro-s-triazines of high purity which do not require further purification.

SUMMARY OF THE INVENTION

I have now discovered an improvement whereby the amount of polymer formed in the acid-catalyzed reaction of $\alpha,\beta$-olefinically unsaturated nitriles and formaldehyde is markedly reduced. In addition to reducing the amounts of polymeric impurities formed, the present invention also provides higher yields of the perhydro-s-triazines than were heretofore possible.

It was unexpected to find in the reaction of $\alpha,\beta$-olefinically unsaturated nitriles with formaldehyde using carbon tetrachloride as the reaction medium, that when the amount of acid catalyst employed was reduced and an excess of the $\alpha,\beta$-olefinically unsaturated nitrile employed, that the amount of undesirable polymeric product formed during the reaction is minimized and yields of perhydro-s-triazine greater than 95% are obtained. In conducting the present process, the acid catalyst is employed at a concentration ranging from about 0.05 to 0.75 gram per mol of formaldehyde with the $\alpha,\beta$-olefinically unsaturated nitrile present in about 5 to 30% excess based on formaldehyde.

DETAILED DESCRIPTION

The present improved process is directed to the reaction of $\alpha,\beta$-olefinically unsaturated nitriles with formaldehyde. The $\alpha,\beta$-olefinically unsaturated nitriles which may be employed have the general formula

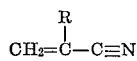

wherein R is an alkyl group containing from 1 to 4 carbon atoms such as methyl, ethyl, propyl and butyl. Other $\alpha$-substituted nitriles such as, for example, $\alpha$-phenyl acrylonitrile, $\alpha$-tolyl acrylonitrile, $\alpha$-benzoyl acrylonitrile, $\alpha$-phenylhexyl acrylonitrile and the like may be employed in the present process if desired.

The formaldehyde employed should be substantially anhydrous. Accordingly, the formaldehyde will be obtained from sources such as s-trioxane or paraformaldehyde which produce formaldehyde in the presence of acid or when heated. Best results have been obtained with s-trioxane.

Chlorinated hydrocarbon solvents such as carbon tetrachloride, ethylene dichloride, trichloroethylene, perchloroethylene, s-tetrachloroethane and the like are employed as the reaction medium. Excellent results have been obtained when carbon tetrachloride is employed. Typically, the carbon tetrachloride:formaldehyde weight ratio will range from about 25:1 to about 3:1.

An acid catalyst is utilized. In general, inorganic or organic acids such as sulfuric acid, phosphoric acid, hydrochloric acid, acetic acid, propionic acid, p-toluene sulfonic acid or the like can be employed. Best results have been obtained when concentrated sulfuric acid is the catalyst.

The reaction is effected by contacting the $\alpha,\beta$-olefinically unsaturated nitrile and the formaldehyde in the carbon tetrachloride solvent in the presence of the acid catalyst. Best results are obtained when the $\alpha$-$\beta$-olefinically unsaturated nitrile is slowly added to the solvent containing the acid catalyst prior to the introduction of the formaldehyde. In this way localized high concentrations of the acid and the development of localized hot-spots within the reaction medium, both of which are conducive to the formation of polymer, are avoided. The reaction temperature will generally range between about 50° C. and 110° C. Best results have been obtained at temperatures between about 60° C. and 90° C.

The improvement of the present process lies in finding that by reducing the concentration of the acid catalyst and increasing the amount of $\alpha$-$\beta$-olefinically unsaturated nitrile that higher purity perhydro-s-triazine can be obtained in increased yields. The amount of sulfuric acid catalyst employed will range between about 0.05 to 0.75 gram sulfuric acid per mol of formaldehyde, and more preferably between about 0.15 and 0.50 gram sulfuric acid per mol of formaldehyde. The $\alpha,\beta$-olefinically unsaturated nitrile will be employed in about 5 to 30% excess based on the formaldehyde and more preferably from about 10 to 20% excess based on the formaldehyde. When the catalyst concentration is maintained within the limits set out above and with the prescribed excess of nitrile, the amount of polymeric by-product formed is markedly reduced. The polymer content of the crude perhydro-s-triazines has been reduced to as low as 1% in this manner, as opposed to previously known processes which typically yield crude perhydro-s-triazine containing 13% or more chloroform-insoluble polymeric material. Also, it has been found that under these conditions yields greater than about 95% of the perhydro-s-triazine are obtained. This represents a significant improvement, since not only is more efficient utilization of the reactants achieved, but also the resulting product is of a much higher purity.

The perhydro-s-triazines are useful for a wide variety of applications. They are polymerizable, either thermally or with a peroxide catalyst to form homopolymers (U.S. Pat. 2,559,694). Their ready polymerizability also makes them useful as comonomers with styrene or other monomers and as cross-linking or vulcanizing agents (U.S. Pat. 2,958,672). Perhydro-s-triazines are also useful as insecticides, fungicides and as chemical intermediates.

The following examples serve to illustrate the inven-

Example I 1,3,5-triacrylylperhydro-s-triazine was prepared in accordance with the present improved process by charging 250 mls. of dry carbon tetrachloride containing 0.8 gram of concentrated sulfuric acid to a 1 liter flask equipped with a stirring means, condenser and dropping funnel. To this solution 105 grams (1.94 mols) of acrylonitrile was added dropwise over a 20 minute period with vigorous stirring. This solution was heated to reflux and a solution of 54 grams (1.0 mol) acrylonitrile and 75 grams s-trioxane (2.5 mols formaldehyde) dissolved in 225 mls. carbon tetrachloride was added dropwise over 1¼ hours. This represents an 18% excess acrylonitrile based on the formaldehyde and 0.32 gram sulfuric acid per mol of formaldehyde. The reaction mixture was then stirred an additional hour under reflux. The reaction mixture was cooled to room temperature and the white solid collected on a filter. Approximately 200 grams crude 1,3,5-triacrylylperhydro-s-triazine was obtained. The crude product was extracted with hot chloroform containing a small amount of 2,6-di-t-butyl-p-cresol. Only 2.6 grams (1.3%) of insoluble polymeric material was obtained after extraction. This represents a 95.8% yield of 1,3,5-triacrylylperhydro-s-triazine.

When a run identical to that described above, except that the reaction time was 3 hours instead of one hour, only a slight increase in the percent insoluble polymer formed was noted.

When the above experiment was repeated employing the same acid concentration but with no excess acrylonitrile, only 83.5% yield crude 1,3,5-triacrylylperhydro-s-triazine was obtained. In addition to the low yield, about twice as much (5%) insoluble polymer was present in the reaction product.

Example II

To demonstrate the advantage of the present improved process, 1,3,5-triacrylylperhydro-s-triazine was prepared following the procedure described by Emmons et al. in J. Amer. Chem. Soc., 74, 5524–5525 (1952). 10.9 grams concentrated sulfuric acid was added to 218 grams acrylonitrile in 815 mls. carbon tetrachloride. The mixture was heated to 65° C. and a solution of 236 grams acrylonitrile and 262.5 grams s-trioxane in 815 mls. carbon tetrachloride added dropwise at a rate so as to maintain a controllable reaction. When the addition was complete the reaction mixture was refluxed for an additional hour. Crude 1,3,5-triacrylylperhydro-s-triazine was recovered by filtration of the reaction product and found to contain 13.2% insoluble polymeric impurity. The yield of the crude 1,3,5-triacrylylperhydro-s-triazine corrected for insoluble polymer was only 72.5%.

Example III

Following the procedure described in Example I, 1,3,5-triacrylylperhydro-s-triazine was prepared using 0.64 gram sulfuric acid per mol formaldehyde and a 20% excess acrylonitrile based on formaldehyde. The reaction time was three hours. A 96% yield of crude 1,3,5-triacrylylperhydro-s-triazine was obtained. Only 2.3% insoluble polymer was present in the recovered crude product.

If amounts of sulfuric acid greater than about one gram sulfuric acid per mol of formaldehyde are employed, yields of the triacrylylperhydro-s-triazine are lowered while the amount of insoluble polymeric material is increased. For example, when 1.28 grams sulfuric acid catalyst per mol of formaldehyde was employed, 5.1% insoluble polymer was obtained even when a 20% excess acrylonitrile was employed. When no excess acrylonitrile was employed at this same catalyst concentration, the percent insoluble polymer formed was even greater. In the latter instance the yield of crude perhydro-s-triazine was also decreased significantly.

Example IV

The polymerizability of the 1,3,5-triacrylylperhydro-s-triazine was demonstrated by heating a solution containing about 10% 1,3,5-triacrylylperhydro-s-triazine in chloroform with a small amount benzoyl peroxide catalyst. A brittle white resinous product was obtained. The resin is useful for impregnating textile materials and the like.

From the above examples the improvement achieved with the present process is evident. These examples clearly demonstrate the greatly improved yields of high purity perhydro-s-triazine are now possible when the reaction is conducted using an excess of the α,β,-olefinically unsaturated nitrile and a low concentration of the acid catalyst.

I claim:

1. In the process for preparing perhydro-s-triazines from formaldehyde and an α,β-olefinically unsaturated nitrile of the formula

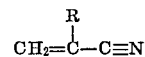

wherein R is an alkyl group containing from 1 to 4 carbon atoms, the improvement which comprises reacting in a chlorinated hydrocarbon solvent and at a temperature of from 50° C. to 110° C. s-trioxane with a 5 to 30% excess based on formaldehyde of the α,β-olefinically unsaturated nitrile in the presence of about 0.05 to 0.75 gram of an acid catalyst per mol of formaldehyde.

2. The process of claim 1 wherein the chlorinated hydrocarbon solvent is carbon tetrachloride and the acid catalyst is concentrated sulfuric acid.

3. The process of claim 2 wherein 10 to 20% excess based on formaldehyde of the α,β-olefinically unsaturated nitrile is employed with about 0.15 gram to 0.50 grams of the acid catalyst.

4. The process of claim 2 wherein the α,β-olefinically unsaturated nitrile is acrylonitrile.

5. The process of claim 2 wherein the α,β-olefinically unsaturated nitrile is methacrylonitrile.

References Cited

UNITED STATES PATENTS 2,559,835  7/1951  Zerner et al. _____ 260—248
2,568,620  9/1951  Gresham et al. _____ 260—248

OTHER REFERENCES

Emmons et al.: J. Amer. Chem. Soc., vol. 74, pp. 5524–5 (1952).

HENRY R. JILES, Primary Examiner

J. M. FORD, Assistant Examiner

U.S. Cl. X.R.

260—88.3, 875, 999